Oct. 10 1933.  A. HALL-BROWN  1,930,198
SUPERCHARGING OF INTERNAL COMBUSTION ENGINES
Filed Sept. 1, 1926  4 Sheets-Sheet 1
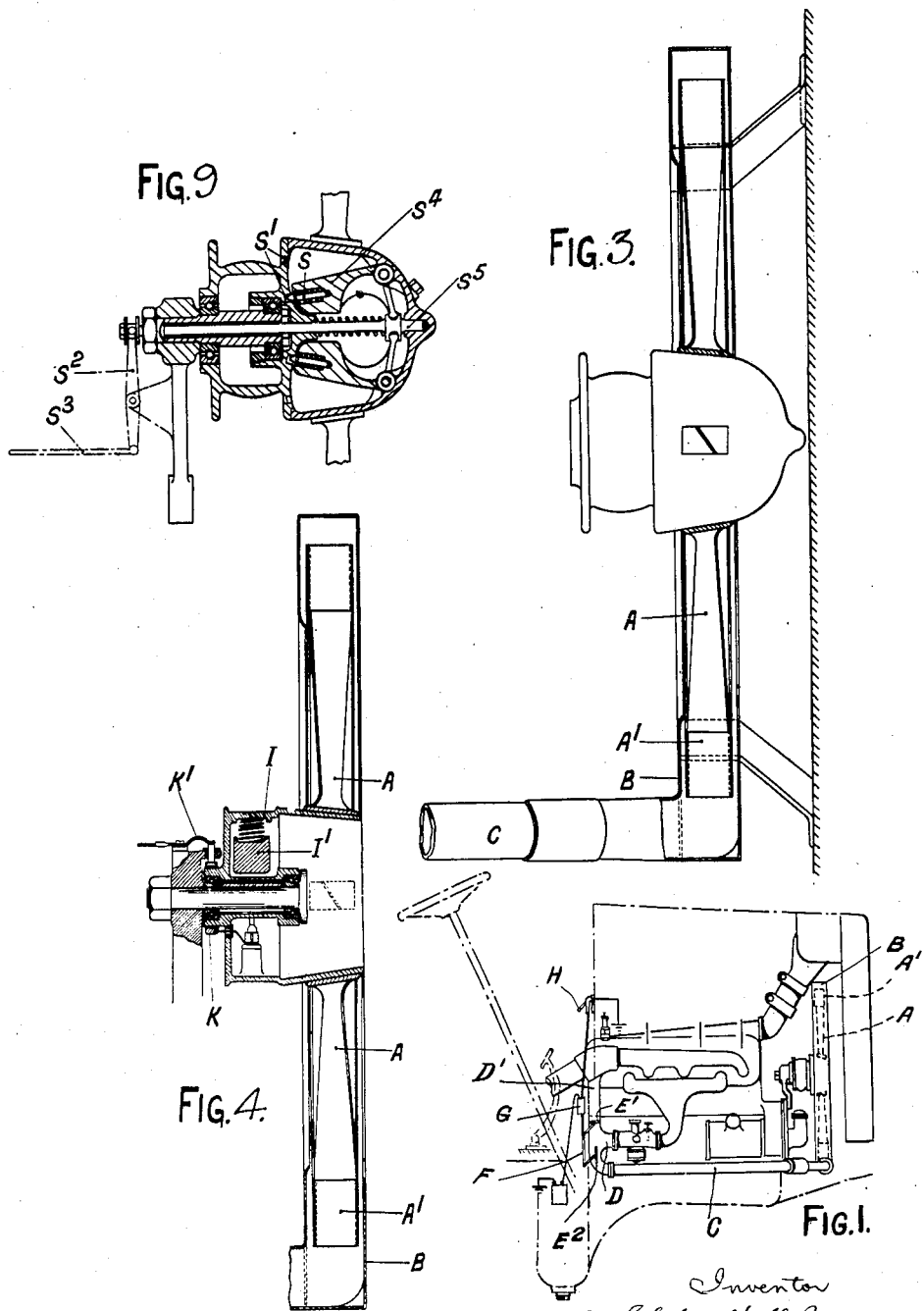

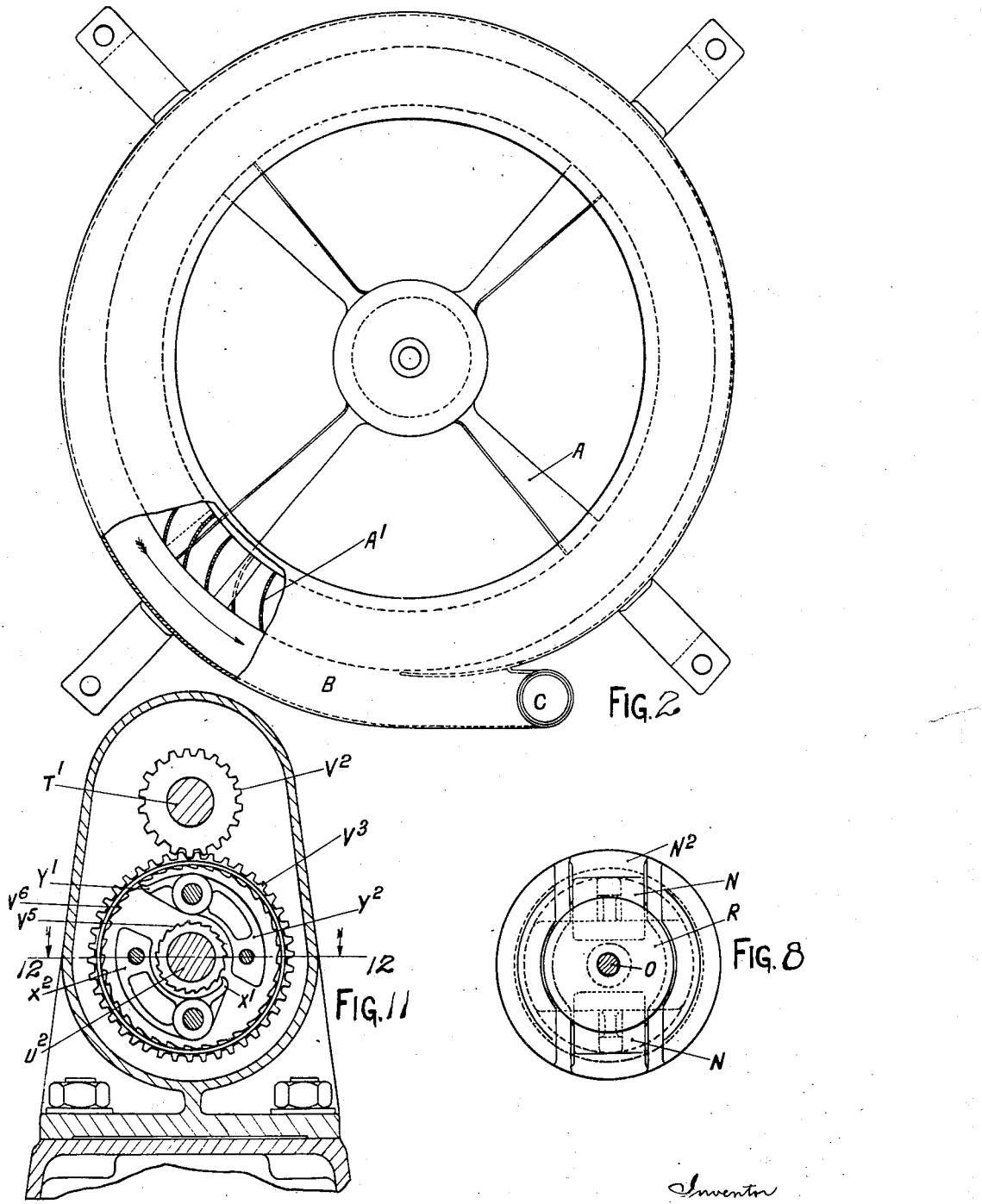

Oct. 10 1933.  A. HALL-BROWN  1,930,198
SUPERCHARGING OF INTERNAL COMBUSTION ENGINES
Filed Sept. 1, 1926  4 Sheets-Sheet 3
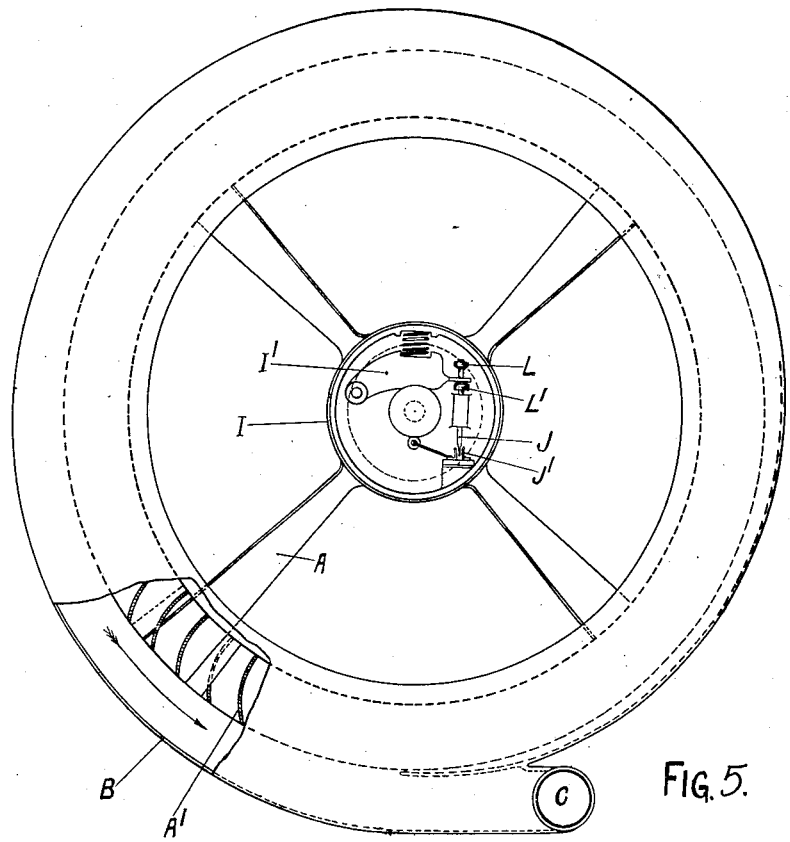
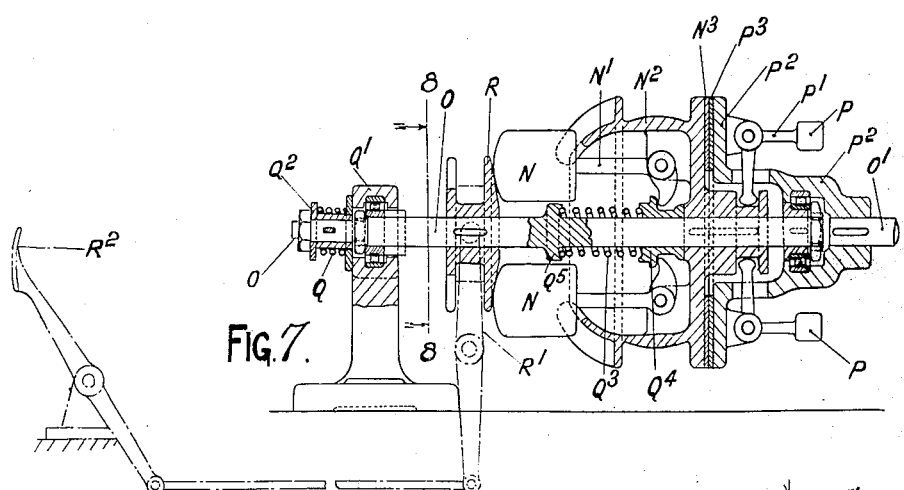

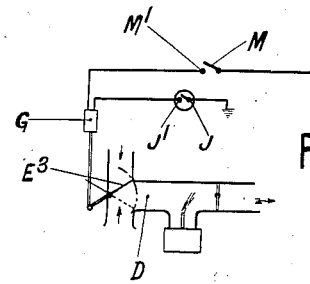
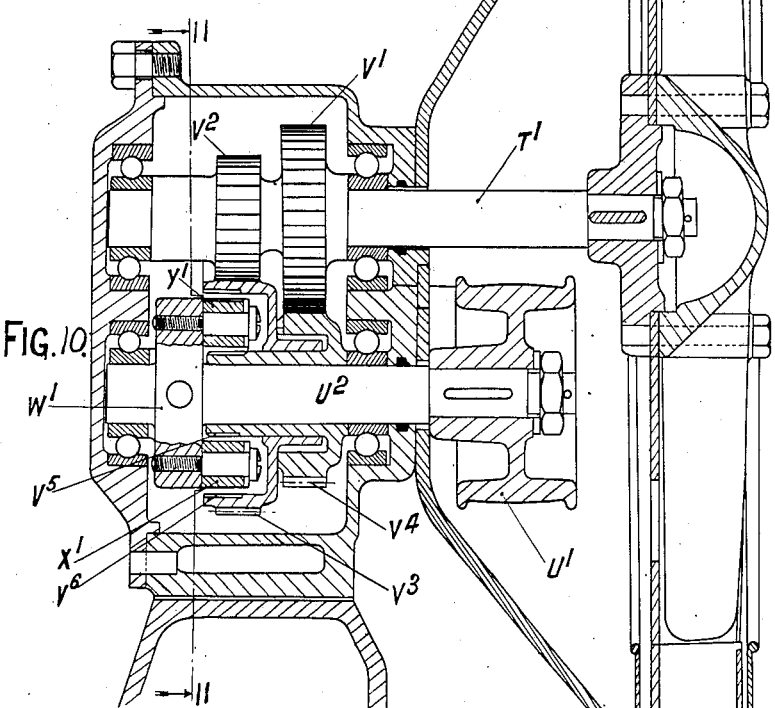
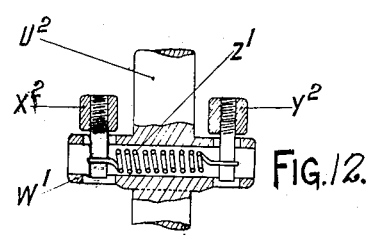

Patented Oct. 10, 1933

1,930,198

UNITED STATES PATENT OFFICE 1,930,198

SUPERCHARGING OF INTERNAL COMBUSTION ENGINES

Archibald Hall-Brown, Surrey, England, assignor to Bendix Aviation Corporation, Chicago, Ill., a corporation of Delaware Application September 1, 1926, Serial No. 132,938, and in Great Britain September 8, 1925

9 Claims. (Cl. 123—119)

This invention relates to the super-charging of internal combustion engines.

The invention is illustrated in the accompanying drawings in which

Fig. 1 illustrates diagrammatically an engine fitted with one form of super-charging means and with means for controlling the supply of compressed air or air at ordinary pressure to the carburetor or vaporizer of the engine.

Figs. 2 and 3 show diagrammatically in front view and in transverse section one form of an improved fan for effecting super-charging, the fan being shown in the position ordinarily taken by radiator cooling fans and serving for cooling purposes in addition to supercharging purposes.

Fig. 4 is an axial section and Fig. 5 an elevation of an arrangement of fan having a governing device for automatically controlling the super-charging incorporated in the fan pulley.

Fig. 6 is a diagram of the electric connections of the arrangement shown in Figs. 4 and 5.

Fig. 7 shows in sectional elevation another form of governing device for controlling super-charging, and Fig. 8 is a section on the line 8—8 of Fig. 7.

Fig. 9 is a detail view of a still further form of governor for controlling the super-charging.

Fig. 10 is an axial section of a super-charger fan equipped with two-speed gearing, and Fig. 11 is a section on the line 11—11 of Fig. 10.

Fig. 12 is a fragmentary section on the line 12—12 of Fig. 11.

Throughout the figures like references indicate like parts.

Referring particularly to Figs. 1 to 3, in accordance with one embodiment of the invention the usual radiator cooling fan A is provided with a peripheral vaned section A', shrouded or encased in a casing B which is connected with a blast pipe C leading from the casing B to the carburettor intake D, there being connected to the blast pipe a balance pipe (not shown) for equalizing the pressures in the fuel container or containers and in the intake pipe.

To permit of the carburetion of air under ordinary pressure when super-charging is to be interrupted, an ordinary suction inlet D' leading to the intake D is also provided, and in order to permit of cutting out or controlling the super-charging a pair of butterfly valves E', E² is arranged in the branches C, D' leading to the intake D. The valves E' and E² are connected for movement in unison by a link F and may be moved to close one branch and open the other in order to interrupt or initiate super-charging by means of a solenoid G controlled by a switch H on the dash as in Fig. 1.

Obviously other mechanical or electrical controlling means may be employed for controlling the valve or valves and thus determining when super-charging is to be initiated or interrupted.

The control of the super-charging may, however, be effected automatically by means of a governing device driven from the engine and controlling mechanically or electrically valves or a valve or the like, located, say, in the branches leading to the intake D from the atmosphere or from the blast pipe.

One embodiment of such an arrangement is illustrated in Figs. 4 and 5, which show an electrical governing device incorporated mainly in the pulley of a fan such as above described and in its bracket.

In Figs. 4 and 5, I denotes the fan pulley and I' a governor weight pivotally mounted therein, J is a switch element formed with spaced collars L, L' engageable by the governor weight. Normally the switch element J is in engagement with contacts of which the contact J' is connected with an insulated slip ring K contacted by a collecting brush K'. The weight I' is contrived to move the switch element J out of or into engagement with the contacts J', lost motion of the weight I' being permitted by reason of the spacing of the collars L, L'. The engine speed may thus vary between pre-determined limits without actuation of the switch.

In series with this governor-controlled switch there is provided a switch M, with contact M' (see Fig. 6) operated by the throttle lever in a manner which will be well understood. With the described arrangement of governor when the engine speed falls, due to increase in the external load with the throttle opened, the circuit controlled by the switches is closed, the solenoid G is energized and the valve E³ or valves E', E² controlling the supply of air from the super-charger is, or are, opened and the supply of atmospheric air is interrupted. When the engine speed increases due to fall in the external load, the governor weight I' swings outwards due to centrifugal force and engaging the collar L opens the switches J, J' thereby de-energizing the solenoid G, (see Fig. 6) and allowing the valve E³ to move into a position to interrupt the flow of air from the super-charger to the intake and allow supply of atmospheric air.

A similar result may be obtained by means of a double governor comprising a main governor and an auxiliary governor, constructed and arranged as illustrated in Figs. 7 and 8.

As shown, the main governor is constituted by weights N carried by levers N' pivotally mounted in a belt driven pulley $N^2$ keyed to a rotary spindle O coaxial with the super-charger fan spindle O'. The pulley $N^2$ and with it the spindle O derive rotation from the engine. The auxiliary governor is constituted by weights P carried by levers P' pivotally mounted on a flanged boss $P^2$ keyed to the spindle O'. The pulley $N^2$ and the boss $P^2$ present coacting frictional faces $N^3$ and $P^3$ which, when in engagement, cause the spindle O' and the super-charger fan to rotate in unison with the spindle O.

Normally the faces $N^3$, $P^3$ are maintained out of engagement by a spring Q interposed between a stationary bracket Q' and a collar $Q^2$ on the spindle O.

Feathered to the spindle O and slidable thereon is a sleeve R engaged by a fork R' connected to the accelerator $R^2$. On depression of the accelerator, the sleeve R engages the weights N and urges the face $N^3$ into engagement with the face $P^3$ (see Fig. 7) thereby causing the super-charger fan to rotate.

Should the engine shaft and, consequently, the spindle O be rotating at high speed, the weight N will occupy a position in which they are partially clear of the sleeve R and engagement between the faces $N^3$, $P^3$ will not be effected.

Should the engine speed become low whilst the accelerator is depressed (as when the vehicle is climbing a hill) the weights N will move radially inwards, due to decrease in centrifugal force aided by the action of a spring $Q^3$ by way of a sleeve $Q^4$ on the levers N' and, being engaged by the inclined face of the sleeve R, the weights N will urge the face $N^3$ into engagement with the face $P^3$.

As the speed of the super-charger fan increases, the auxiliary governor weights P will move radially outwards and thus cause greater pressure between the faces $N^3$, $P^3$. Consequently the faces $N^3$, $P^3$ will not disengage until a greater engine speed has been attained than that at which the faces were caused to engage.

Should it be desired that the super-charger fan rotate at high engine speed, the sleeve R may be made to act directly on the spindle O, so as to push it axially when the accelerator is depressed, for instance by means of a sleeve abutting against collar $Q^5$.

A still further form of the governing device is illustrated in Fig. 9 the governing device being shown incorporated in the boss of a fan such as that shown in Figs. 2 and 3. The governor, which takes the form of an ordinary bell crank governor, is fitted with spring-pressed studs S adapted to engage in either set of two sets of recesses S', the studs S engaging in either the outer or the inner set of recesses corresponding to the high or low revolutions and, conversely low or high engine load. The governor serves to actuate through a lever $S^2$ a rod $S^3$ to control the supply of compressed air from the super-charger or of air under ordinary pressure. As the engine revolutions increase the governor weights $S^4$ move outwards from the axes of the governor spindle $S^5$ and will be held by means of the studs S and recesses S' in the outer position, corresponding to a displacement of the spindle $S^5$ from the position shown, so that the valve or valves controlling the supply of compressed air to the carburettor will be closed and super-charging interrupted. Until the engine revolutions have fallen sufficiently under load for the governor weights to move into innermost position supercharging cannot recommence.

It is a natural characteristic of super-chargers of either the positive blower type or the fan type that, if they give adequate pressure and volume at low speeds they give too much of both at high speeds. A further object of the invention is therefore to supply a simple gearing which will speed the fan up at low engine speeds and allow the fan to operate at engine speed when the latter increases.

As shown in Figs. 10 and 11, the spindle T' of the super-charger fan A' carries gear wheels $V^1$ and $V^2$ respectively meshing with gear wheels $V^4$ and $V^3$ connectible to a counter shaft $U^2$ carrying a belt driven pulley U'.

Pawls X' and Y' are pivotally mounted on a collar W' on the shaft $U^2$ and are counter-weighted, respectively, by means of weights $X^2$ and $Y^2$, the pawl X' being capable of engaging teeth $V^5$ formed integral with the gear wheel $V^4$, and the pawl Y' being capable of engaging teeth $V^6$ formed integral with the gear wheel $V^3$.

When the engine shaft and, consequently, the shaft $U^2$ are rotating at low speed the weights $X^2$, $Y^2$ are in their radially innermost positions, in which the pawl Y' is in engagement with the relative teeth $V^6$ on the gear wheel $V^3$, the spindle T' being driven through the intermediary of the gear wheels $V^3$, $V^2$ at a greater speed than that of the shaft $U^2$.

Should the speed of the shaft $U^2$ increase beyond a predetermined limit, the weights $X^2$, $Y^2$ will move radially outwards so that the pawl X' comes into engagement with the relative teeth on the gear wheel $V^4$, the spindle T' being driven through the intermediary of the gear wheels $V^4$, V' at a speed which is less than the speed of the shaft $U^2$.

As shown in Fig. 12 the weights $X^2$, $Y^2$ are interconnected by a spring Z'.

If desired each pawl Y' or X' may be formed as a double pawl capable of engaging the relative teeth on either of the gear wheels $V^3$ or $V^4$.

I claim:—

1. In a supercharging device for internal combustion engines the combination with a fan of governing means comprising a shaft for said fan, a shaft driven from the engine, a collar on said fan shaft, said collar having a friction surface thereon, a member on said engine driven shaft, said member likewise having a friction surface thereon adapted to engage the friction surface on said collar, spring means for normally holding said surfaces out of engagement, main pivoted weights, a sleeve mounted on said engine driven shaft, and means for bringing said sleeve into engagement with said weights and forcing said friction surfaces together, said last mentioned means controlling the engine speed.

2. In a supercharging device for internal combustion engines the combination with a fan of governing means comprising a shaft for said fan, a shaft driven from the engine, a collar on said fan shaft, said collar having a friction surface thereon, a member on said engine driven shaft, said member likewise having a friction surface thereon adapted to engage the friction surface on said collar, spring means for normally holding said surfaces out of engagement, main pivoted weights on said member adapted to hold said surfaces out of engagement at high engine speeds, auxiliary pivoted weights on said collar adapted to urge said surfaces together at high engine speeds, and means for forcing said surfaces into engagement.

3. In a supercharging device for internal combustion engines the combination with a fan of governing means comprising a shaft for said fan, a shaft driven from the engine, a collar on said fan shaft, said collar having a friction surface thereon, a member on said engine driven shaft, said member likewise having a friction surface thereon adapted to engage the friction surface on said collar, spring means for normally holding said surfaces out of engagement, weighted means on said member for bringing said surfaces into engagement at low engine speeds, and weighted means on said collar for holding said surfaces in engagement until a higher speed than that at which engagement was effected has been reached.

4. In a supercharging device for internal combustion engines the combination with a fan of governing means comprising a shaft for said fan, a shaft driven from the engine, a collar on said fan shaft, a pulley on said engine driven shaft, said collar and pulley each having a friction surface thereon adapted to be brought into engagement with one another, spring means surrounding said engine driven shaft for normally holding said surfaces out of engagement, main pivoted weights on said pulley adapted to hold said surfaces out of engagement at high engine speeds, auxiliary pivoted weights on said collar adapted to engage a portion of said pulley and urge said surfaces together at high engine speeds, a sleeve slidably mounted on said engine driven shaft, and means for bringing said sleeve into engagement with said main pivoted weights and forcing said friction surfaces together, said last named means controlling the engine speed.

5. In a supercharging device for internal combustion engines the combination with a fan of governing means comprising a shaft for said fan, a shaft driven from the engine, a collar on said fan shaft, a pulley on said engine driven shaft, said collar and pulley each having a friction surface thereon adapted to be brought into engagement with one another, spring means surrounding said engine driven shaft for normally holding said surfaces out of engagement, main pivoted weights on said pulley adapted at high engine speeds to be moved radially outward and thereby hold said surfaces out of engagement, auxiliary pivoted weights on said collar adapted at high engine speeds to be moved radially outward to urge said surfaces together, a tapered sleeve slidably mounted on said engine shaft and adapted to entirely engage said main pivoted weights when the latter are in their retracted position, a pivoted lever adapted to move said sleeve into and out of engagement with said main pivot weights, and means for simultaneously controlling the engine speed and actuating said pivoted lever to force said sleeve into engagement with said main pivoted weights and thereby axially displace said pulley and bring said surfaces into engagement.

6. In a supercharging device for internal combustion engines, the combination of a driven shaft, a rotatable supercharger element drivably connected to said shaft and arranged to cool the engine during operation of said element, a driving shaft operatively connected with the engine, means for drivably connecting said shafts including friction clutch members on the driving and driven shaft, respectively, means on said driving shaft for causing said clutch members to engage at a predetermined speed of said driving shaft, and means carried by the driven clutch member for increasing the frictional engagement between the clutch members as the speed of the driven shaft increases.

7. In a supercharging device for internal combustion engines, the combination of a driven shaft, a rotatable supercharger element drivably connected to said shaft and arranged to cool the engine during operation of the element, a driving shaft operatively connected with the engine, means for drivably connecting said shafts including friction clutch members on the driving and driven shafts, respectively, centrifugally actuated means carried by the driving clutch member for causing said clutch members to engage at a predetermined speed of said driving shaft, and means carried by the driven clutch member for increasing the frictional engagement between the clutch members as the speed of the driven shaft increases until a higher speed than that at which engagement was effected has been reached.

8. In a supercharging device for internal combustion engines, the combination of a driven shaft, a rotatable supercharger element drivably connected to said shaft and adapted to cool the engine during operation of said element, a driving shaft operatively connected with the engine, means for drivably connecting said shafts including friction clutch members on the driving and driven shafts, respectively, and centrifugally actuated means carried by the driven clutch member and having a connection with the driving clutch member for increasing the frictional engagement between said clutch members as the speed of rotation of the supercharger element increases until a higher speed than that at which engagement of said members was effected has been reached.

9. In a supercharging device for internal combustion engines the combination with a fan of governing means comprising a shaft for said fan, a shaft driven from the engine, a collar on said fan shaft, said collar having a friction surface thereon, a member on said engine driven shaft, said member likewise having a friction surface thereon adapted to engage the friction surface on said collar, spring means for normally holding said surfaces out of engagement, and weighted means for bringing said surfaces into engagement when said engine speed falls below a predetermined value.

ARCHIBALD HALL-BROWN.